US008705426B2

(12) United States Patent
Corroy

(10) Patent No.: US 8,705,426 B2
(45) Date of Patent: Apr. 22, 2014

(54) ENERGY EFFICIENT TRANSMISSION IN A NETWORK

(75) Inventor: Steven Corroy, Eindhoven (DE)

(73) Assignee: Koninklijke Philips N.V., Eindhoven (NL)

( * ) Notice: Subject to any disclaimer, the term of this patent is extended or adjusted under 35 U.S.C. 154(b) by 173 days.

(21) Appl. No.: 13/263,781

(22) PCT Filed: Apr. 6, 2010

(86) PCT No.: PCT/IB2010/051478
§ 371 (c)(1),
(2), (4) Date: Oct. 10, 2011

(87) PCT Pub. No.: WO2010/119370
PCT Pub. Date: Oct. 21, 2010

(65) Prior Publication Data
US 2012/0033584 A1 Feb. 9, 2012

(30) Foreign Application Priority Data
Apr. 15, 2009 (EP) .................................. 09305320

(51) Int. Cl.
*G08C 17/00* (2006.01)
*H04L 12/28* (2006.01)

(52) U.S. Cl.
USPC ........................... 370/311; 370/230; 370/254

(58) Field of Classification Search
None
See application file for complete search history.

(56) References Cited

U.S. PATENT DOCUMENTS

| 7,085,284 | B1 | 8/2006 | Negus | |
|---|---|---|---|---|
| 7,359,753 | B2 | 4/2008 | Bange | |
| 7,389,528 | B1 | 6/2008 | Beser | |
| 7,492,773 | B2 | 2/2009 | Hester | |
| 7,783,908 | B2 * | 8/2010 | Bogovac | 713/323 |
| 8,089,909 | B2 * | 1/2012 | Kim et al. | 370/311 |
| 2002/0003807 | A1 * | 1/2002 | Amit et al. | 370/447 |

(Continued)

FOREIGN PATENT DOCUMENTS

| EP | 1594253 A1 | 9/2005 |
|---|---|---|
| WO | WO2006098891 A2 | 9/2006 |

OTHER PUBLICATIONS

Buettner et al. X-MAC: A Short Preamble MAC Protocol for Duty-Cycled Wireless Sensor Networks—2006.*

(Continued)

*Primary Examiner* — Marsha D Banks Harold
*Assistant Examiner* — Christopher Wyllie
(74) *Attorney, Agent, or Firm* — Larry Liberchuk

(57) ABSTRACT

The present invention relates to a method for data packet transmissions between a source node and a destination node in a network, the method comprising: —the nodes being configured with an initial sleeping time period duration $SP_{init}$ and an initial wake-up time period duration $LP_{init}$, —the source node sending a preamble, segmented in micro-preambles, for indicating the beginning of a transmission, the micro-preambles being separated by listening slots, —the destination node sending, upon receipt of at least one of the micro-preamble, a packet indicating its presence, called "Ready-To-Receive", or RTR, packet, and —the source node sending, in response to the RTR packet, a data packet intended for the destination node, wherein the step of sending a preamble comprises: —the source node determining, based on $SP_{init}$ and on $LP_{init}$, an optimal size of the micro-preambles that minimizes the overall energy consumption in the network for sending and receiving packets related to this preamble transmission.

12 Claims, 4 Drawing Sheets

(56) References Cited

U.S. PATENT DOCUMENTS

| | | |
|---|---|---|
| 2003/0228875 A1 | 12/2003 | Alapuranen |
| 2005/0129055 A1* | 6/2005 | Hall et al. .................... 370/461 |
| 2006/0285579 A1* | 12/2006 | Rhee et al. ................... 375/132 |
| 2007/0014268 A1 | 1/2007 | Kim |
| 2007/0291719 A1* | 12/2007 | Demirhan et al. ............ 370/338 |
| 2008/0137684 A1 | 6/2008 | Huang |
| 2008/0232270 A1 | 9/2008 | Fleming |
| 2009/0023391 A1 | 1/2009 | Falck |
| 2009/0046611 A1 | 2/2009 | Ryu |
| 2009/0059827 A1 | 3/2009 | Liu |
| 2009/0207767 A1* | 8/2009 | Hirsch ......................... 370/311 |
| 2010/0202335 A1* | 8/2010 | Borean et al. ................. 370/311 |
| 2010/0296522 A1* | 11/2010 | Goh et al. ..................... 370/474 |
| 2011/0128869 A1* | 6/2011 | Coleri Ergen et al. ........ 370/252 |
| 2011/0164605 A1* | 7/2011 | Zhen et al. .................... 370/347 |
| 2011/0182222 A1* | 7/2011 | Patel et al. .................... 370/311 |
| 2011/0211513 A1* | 9/2011 | Coleri Eregen et al. ...... 370/311 |
| 2011/0269414 A1* | 11/2011 | Falck et al. ................... 455/100 |
| 2012/0033584 A1* | 2/2012 | Corroy .......................... 370/254 |

OTHER PUBLICATIONS

Polastre et al. Versatile Low Power Media Access for Wireless Sensor Networks 2004.*

* cited by examiner

ENERGY EFFICIENT TRANSMISSION IN A NETWORK

FIELD OF THE INVENTION

The present invention relates to transmission of data in networks, namely in body area networks.

This invention is, for example, relevant for networks carrying out body-coupled communication (BCC), which consists in sending information over the human body via electric field. More precisely, the invention relates to low-power transmissions methods for this type of network.

BACKGROUND OF THE INVENTION

Many medium access control protocols for wireless sensor networks have been proposed for allowing low power transmissions in these networks whose nodes are generally energy-restricted, due to the fact that they are often battery powered. Actually, in these networks, nodes periodically go to sleep and wake-up using the same schedule. Then, when a node wants to transmit a packet, it knows when all the network will be awaken and can transmit at this time. Such a method requires perfect synchronization of the network. Thus, even if it is very efficient, it is not well adapted for BCC body-area networks whose topology is highly dynamic, since the nodes are worn by a user, and thus are susceptible to be added or removed at any time, thus impeding almost all attempts to properly synchronize the whole network. Moreover, since devices in this type of network might be worn all day long for only a few transmission period, synchronization is not really useful, and represents a waste of energy.

Other existing protocols use asynchronous sleep schedules. In these protocols, each node wakes-up and sleeps independently from all other nodes. When a transmitting node wants to reach another node, it sends a long preamble, which has a size longer than the maximum time between two wake-up times of any receiving node. Thus this long preamble will "catch" the target receiver and send data afterward. Usually, the long preamble is preceded and immediately followed by contention elements used for detecting concurrent transmissions and therefore avoid collisions. This approach is very powerful since it enables to have an asynchronous network without coordinating node. However the long preamble is a significant overhead. Indeed, as soon as a receiving node catches a long preamble indicating that a transmission will start; it has to wait until the end of the preamble before getting the data, which represents a considerable loss of energy.

A possible solution for reducing the overhead resulting from the long size of the preamble would be to segment it into several micro-preambles separated by listening slots. Thus, it has been proposed some protocols wherein micro-preambles as small as possible are used, in order to decrease the delay cause by the long preamble. In these protocols, the first micro-preamble forming the complete preamble is preceded by a contention element, and the last one is also followed by a contention elements. However, these protocols are not as energy-efficient as it would be expected for body-area networks such as medical sensor networks comprising sensor devices laid on a user's body.

SUMMARY OF THE INVENTION

An objective of the invention is thus to provide a method for transmitting packet in wireless networks that induces less energy-consumption than existing protocols.

Another objective of the invention is to propose a method with reduced overhead and reduced latency.

Another objective of the invention is to provide a method avoiding collision between concurrent transmissions in the network.

Yet another objective of the invention is to provide a method than can be dynamically adapted to the on-going traffic in the network.

The present invention departs from the unexpected observation that a body-coupled communication system uses more energy while receiving than while transmitting. Based on this element, the invention proposes a method for data packet transmissions between a source node and a destination node in a network, the method comprising:

the nodes being configured with an initial sleeping time period duration $SP_{init}$ and an initial wake-up time period duration $LP_{init}$, the source node sending a preamble, segmented in micro-preambles, for indicating the beginning of a transmission, the micro-preambles being separated by listening slots, the destination node sending, upon receipt of at least one of the micro-preamble, a packet indicating its presence, called "Ready-To-Receive", or RTR, packet, and the source node sending, in response to the RTR packet, a data packet intended for the destination node, wherein the step of sending a preamble comprises:

the source node determining, based on $SP_{init}$ and on an optimal size of the micro-preambles that minimizes the overall energy consumption in the network for sending and receiving packets related to this preamble transmission.

This invention makes it possible to calculate a size of micro-preambles that induces less energy consumption than existing methods. In a preferred embodiment, this optimal size is determined such that the sum of micro-preambles sizes and the listening slots is equal to the value $SP_{init}+2*LP_{init}$.

Moreover, as described before, conventional methods make use of contention elements before and after the preambles, for checking availability of the channel. However, transmission of these elements requires energy, and thus in a particular embodiment of the present invention, it is suggested to suppress them. Accordingly, in one embodiment, a method according to the invention is such that the first micro preamble is the first element sent by the source node to the destination node, and the element sent immediately after the last micro preamble is the data packet. This contention-free method is thus highly efficient in terms of energy-cost. Nevertheless, since the contention elements are not used anymore for checking availability of the channel before transmission, there is a risk of collision between transmissions from different nodes of the network.

To avoid such collisions, in one embodiment, the method comprises the step for the source node, before transmitting the micro-preambles, of determining a random size offset and modifying the size of the micro-preambles by applying this offset to the optimal value. In this way, the size of the micro-preambles around the optimal value, so that when one transmitter wakes-up and senses another preamble it stops to transmit.

A method according to the invention is aimed at being used in different body-coupled communications applications, for which the traffic patterns are really diverse. Although a low duty cycle is very efficient for low density traffic, it reduces the performance of the network when a high throughput is required by the application. For example user identification at a security door requires only few data (small packet size), few times per day (low frequency) and in an unpredictable way (low periodicity). On the other side, continuous patient monitoring, where sensors stream data on the body, requires to send many data (big packet size), continuously (high frequency) and in a very predictable way (high periodicity). Even some applications are inactive during most of the day (i.e. not used often) but when used require a lot of data transmission. It means that the MAC protocol must be capable of minimizing energy consumption when the traffic is low and to maximize the reliability and efficiency when it becomes high. Thus, in one embodiment, the invention proposes a method that enables all nodes in the network to dynamically and independently change their sleep time by observing the on-going traffic on the channel. Then, the method comprises the following steps:

when the destination node enters a wake-up time period, observing the on-going traffic on the channel used for exchanging packets with the other node, based on this observation, the destination node adapting the duration SP of its sleeping time period.

In a particular embodiment, the adaptation of the duration SP of the sleeping time period is performed as follows:

if the channel is observed as being busy, the sleeping time period duration is decreased, and if the channel is observed as being idle, then the sleeping time is increased.

Moreover, in another particular embodiment, the observation step comprises performing at least two observations, and storing the observation results in a memory of the node, and wherein the adaptation step is performed after several observations, based on the stored results.

It has to be noted here that all these features related to the dynamic adaptation of the sleeping time period based on the traffic can be used with a conventional MAC protocol, independently from other features of the invention.

In some applications of body-coupled communication networks, there might exist priorities for the different data exchanges. For example, in the case where a data packet represents an alarm or any other critical event, it would be useful to handle this packet with the required high priority. In this view, one embodiment of the present invention further comprises the step of introducing a priority field in the preambles transmitted by the source node, this field comprising a priority value. Such a feature makes it possible to overpass the normal access scheme of a contention-free MAC protocol. Then, the idea is as follows, when the network comprises a first source node, a second source node and a destination node:

the first source node transmitting a first micro-preamble to the destination node on a transmission channel, the first source node listening to the transmission channel, during a listening slot, and detecting a second micro preamble transmitted by a second source node to the destination node, the first node comparing the priority value embedded in the second micro preamble with the priority value embedded in the first micro-preamble, the first node deciding, based on the result of the comparison, to stop or to keep on transmitting further micro-preambles.

Another way to deal with such priority issue is to use a variable number of listening slots. Then, in one embodiment, the number of micro-preambles and idle slots is different in the preamble transmitted by the first source and the preamble transmitted by the second source. Indeed, a transmitter using a higher number of listening slots will be less prone to acquire the channel than another transmitter with less listen slots. This is simply because the first transmitter will listen to the channel first with a higher probability These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
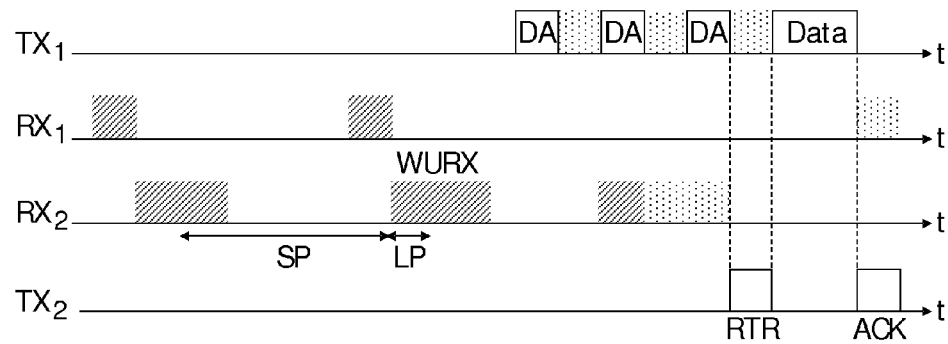
FIG. 1 is a time diagram showing operation of different nodes during a method according to the invention.

The present invention relates to a method for data packet transmission in a network comprising several communication devices, called nodes in this description. In a particular embodiment, these nodes are part of a body-area network using body-coupled communication, thus the nodes may be worn on a user's body. A BCC network often comprises nodes that are either worn by the user on his body or touched by the user, generally for a short time. The number of nodes that are part of the network may therefore be small, for example around ten. Moreover, the topology of such a network, i.e. the number of nodes in the network and their emplacement, is highly dynamic. Indeed, if a user wears an identifier in order to be identified at a door, the network is composed of a single node most of the day and of two nodes for very short period of time. Another example could be a user wearing many BCC-enabled multimedia devices which continuously guard themselves against theft. In that case the user may decide to take or let specific devices at any time modifying the topology of the network although the theft protection application still needs to be performed.

The main requirement of a BCC network related to full-body coverage, which means that any node in contact with the body of a user shall be capable to communicate with any other node as well as in contact with the same user.

In the embodiment herein described, each node of the network is equipped with a wake-up receiver that can scan the channel for a specific period of time and returns the status of the channel.

The nodes periodically wake up and sleep. In the present example, the nodes are initially configured to sleep during a time period SP and to wake-up during a time period LP. When a source node wants to transmit a packet to a destination node, it transmits a preamble segmented in micro-preambles DA. These micro-preambles are separated by listening slots. In a particular embodiment, the duration value of a listening slot is equal to the wake-up period LP of destination node. As soon as the destination node actually detects a micro-preamble, it sends a "Ready-to-Receive", or RTR, packet to the source node, to signal its presence. Then, upon receipt of the RTR packet, the source node stops transmitting micro-preambles, and proceeds directly to the transmission of the data packet. In this embodiment, the destination address, i.e. the address of the destination node, is embedded in the micro-preamble in order to enable this node to determine that it is the actual destination of the micro-preambles.

As previously mentioned, a method according to the invention aims at determining an optimal size of micro-preambles that allows minimizing the overall energy consumption during packet transmission.

For a system where the reception power is about the same as the transmission power, i.e. $P_{Rx}=kP_{TX}$ with $k=1$, the size of a preamble is $L_{preamble}=(2n-1)*SP$ where $$n = \frac{SP+3LP}{2LP}$$

Now, assuming that the wake-up time of the destination node is uniformly distributed over the preamble size, and that it is independent of the of the preamble transmission time, we can derive the average size of the preamble as follows:

$$\overline{L_{preamble}} = \sum_{i=0}^{i=n-1} \frac{1}{n}(2i+1)LP = \frac{SP+3LP}{2}$$

The average energy consumption for the preamble is $$\overline{E_{preamble}} = \overline{L_{preamble}} \cdot P_{TX} = \left(\frac{SP+3LP}{2}\right) \cdot P_{TX}$$

However, as said previously, the present invention departs for the observation that, in BCC network, the reception power is higher than the transmission power, i.e. $k>1$.
Then we have $L_{preamble}=(2n'-1)*SP$ with $$n' = \frac{n+1}{2} = \frac{SP+5LP}{4LP}.$$

Therefore, in such a case, the average energy consumption is:

$$\overline{E_{preamble}} = (n'+(n'-1)k)LP*P_{TX} = \left(\frac{(k+1)SP+(k+5)LP}{4}\right)P_{TX}.$$

Now, the objective is to calculate the optimal size of a micro-preamble for minimizing this energy. Let's assume that the size of a micro preamble is $L_\mu=p*LP$ and $$n = \frac{SP+3LP}{(p+1)LP}$$

with p an integer.
It comes the following average size of the preamble:

$$\overline{L_{preamble}} = \sum_{i=1}^{i=n} \frac{1}{n}((p+1)i-1\grave{a})LP = \left(\frac{(p+1)(n+1)}{2}-1\right)LP = \frac{SP+(p+2)LP}{2}$$

and the following average energy consumption for the preamble $$\overline{E_{preamble}} = \left(\frac{(k+p)SP+(p^2+(4-k)p+2k)LP}{2(p+1)}\right)P_{TX}.$$

By minimizing the energy with respect to p, which determined the size of the micro-preambles, we find $$p_{opt} = \sqrt{\frac{(k-1)(SP+3LP)}{LP}} - 1.$$

Figure 2:
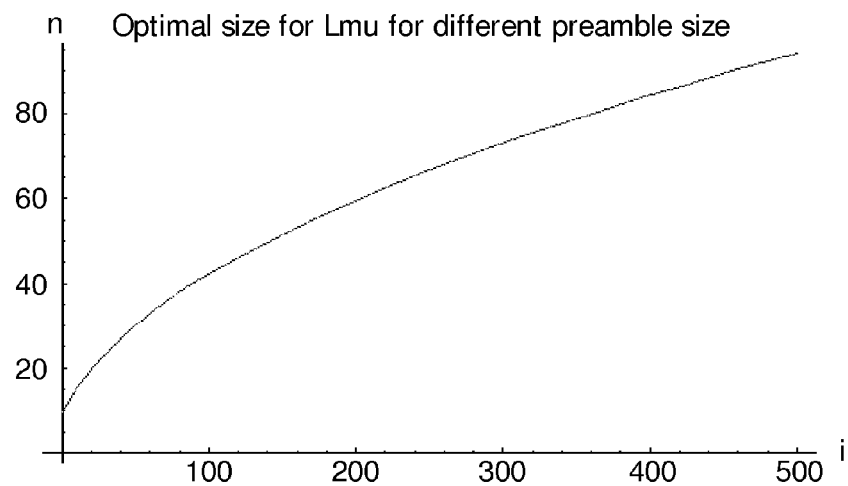
FIG. 2 shows an illustration of the optimal size of the micro-preambles.
Figure 3:
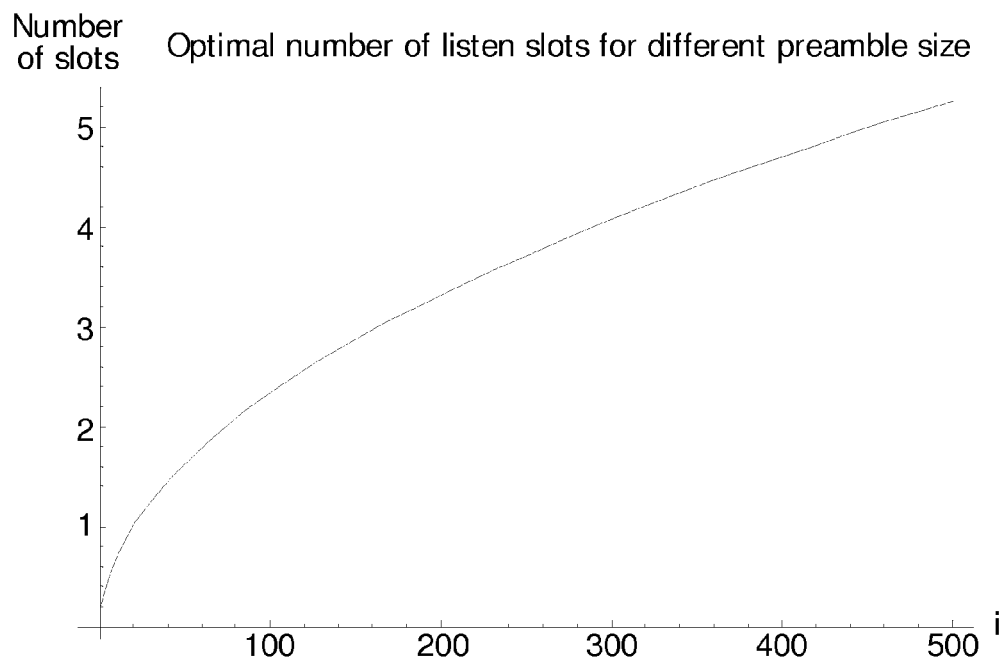
FIG. 3 shows in illustration of an optimal number of listening slots.

FIG. 2 shows an illustration of the optimal size of the micro-preambles in the case where $k=10$. FIG. 3 shows in illustration of an optimal number of listening slots.

As said previously, there is a strong asymmetry between TX power and RX power in BCC systems. Therefore an efficient MAC protocol should tend to minimize the time that a node spends in RX mode, maybe at the expense of the time spent in TX mode. One of the main sources for a node for being in RX mode is contention. For avoiding collisions, a classical algorithm is CSMA/CA. When using this concept, nodes wait for the channel to be idle. For that they stay in RX mode for a certain amount of time, for checking the status of the channel. This is the source of a considerable usage of energy, especially for a BCC network where receiving is of high cost.

To cope with that we propose to make our MAC protocol "contention free". This means that the nodes in a BCC network will start a communication without checking the channel, i.e. nodes go from sleep mode directly to TX mode. This raises the problem of dealing with collisions. First we use the structure of long micro-preamble, which means use a specific, optimal size for micro-preambles which is not necessarily the shortest possible. For solving the collision problem we randomize the size of the micro-preambles around their optimal size. Let's assume that a preamble has n micro-preambles, and consequently n−1 listen slots. Then we generate n−1 random numbers $r_i$ with i in [1, n−1], uniformly distributed between −R and +R which represent the intensity of the randomization. Then, the size of preamble would be: $L_i=L_\mu+r_i \cdot LP$ or $L_n=L_\mu-\Sigma_{i=1}^{n-1} r_i \cdot LP$.

Obviously, such a calculation has to respect some constraints, for example in order to ensure than the size of the micro-preambles is not null or negative.

If we do not randomize the length of the micro-preambles, then all the idle slots occur at the same time, the three nodes detect the channel as idle and keep on sending. After the preamble they all send their data and create a collision. Now if the length of the micro-preambles is randomized, then there is a certain probability that the slots do not occur at the same time. If a node detects a preamble on the channel during a listen slot, then it stops to transmit its own preamble.

In a preferred embodiment of the invention, the sleeping time SP of a node is dynamically and independently adapted by observing the on-going traffic on the channel. Indeed, there are very different requirements for BCC networks in terms of data rate and traffic patterns. Although a low duty cycle is very efficient for low density traffic, it reduces the performance of the network when a high throughput is required by the application. Certain applications send very few information for a long period of time and suddenly require a high throughput while sending a lot of information. One can think about vital sign monitoring where only keep-alive information messages are sent most of the time and more data as soon as a specific pattern is detected. To solve such a problem we developed an algorithm that enables the duty-cycle to be adapted automatically. This is based on the observation from each node of the on-going traffic on the network. Nodes wake-up regularly, i.e. every sleep time, scan the channel with their wake-up receiver and save the status of the channel in a table.

There are three different events for after the scanning:
1. The channel is idle and the node has no packet in its queue, the node saves 0
2. The channel is idle and the node has a packet in its queue, the node saves 1
3. The channel is busy, the node saves 1

Therefore each node collects a sequence of 0 and 1, e.g., 00000100000100001110. From this sequence each node will modify its sleep period applying rules. The maximum number of 0 and 1 which are saved is called the window. A rule applies to the whole window.

In our case we tested a window size of two with following rules
00: increase sleep period (for example multiplies its length by 2)
01: do nothing
10: do nothing
11: decrease sleep period (for example divides its length by 2)

Figure 4:
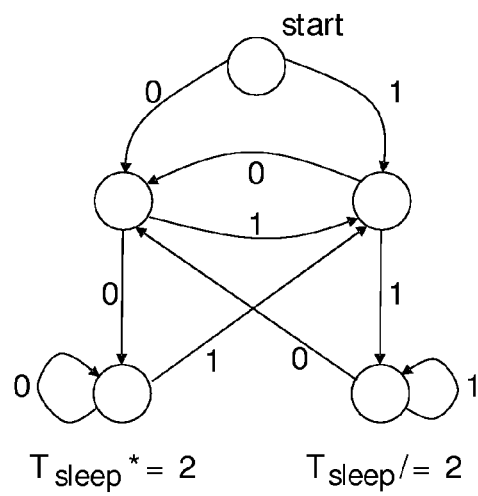
FIG. 4 shows a decision automate used in one embodiment of the present invention.

FIG. 4 shows an automate representing these rules. This automate is described for a window size equal to 2, but this parameter can be easily modified, as well as the function applied on SP, i.e. Tsleep*2 or Tsleep/2.

The size W of the window modifies the reactivity of the system and the function for increase/decrease modifies the intensity of the reaction. It is possible to tune these parameters to match the requirements of specific applications.

This adaptation of the sleeping time of a node can be used in a conventional transmission method, independently from the other features of the invention.

Figure 5:
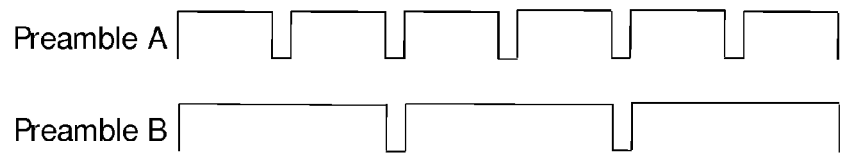
FIG. 5 shows different segmentation of a preamble.

Now, in another embodiment of the invention, to avoid collisions between preambles transmitted by different nodes, we use a variable number of listen slots. Indeed, as can be seen on FIG. 5, preamble B has clearly a higher priority than preamble A, since in case they are both transmitted at the same time, preamble B will always go through.

We assume two colliding preambles, sent by two nodes 1 and 2, with respective number of listen slots $k_1$ and $k_2$.
So we have $$SP = (2i+1) \cdot LP,$$
$$SP = (k_1+1) \cdot L_{\mu 1} + k_1 \cdot LP,$$
$$SP = (k_2+1) \cdot L_{\mu 2} + k_2 \cdot LP,$$
$$L_{\mu i} = \frac{2i - K_i + 1}{K_i + 1} \cdot LP$$

We express d as the distance between the respective first listen slots of the two preambles, in the simple case where the micro-preambles size are not randomized $$d_{12} = L_{\mu 2} - L_{\mu 1}$$
$$d_{12} = \frac{2 \cdot (i+1) \cdot (k_1 - k_2)}{(k_1+1) \cdot (k_2+1)}$$

Figure 6:
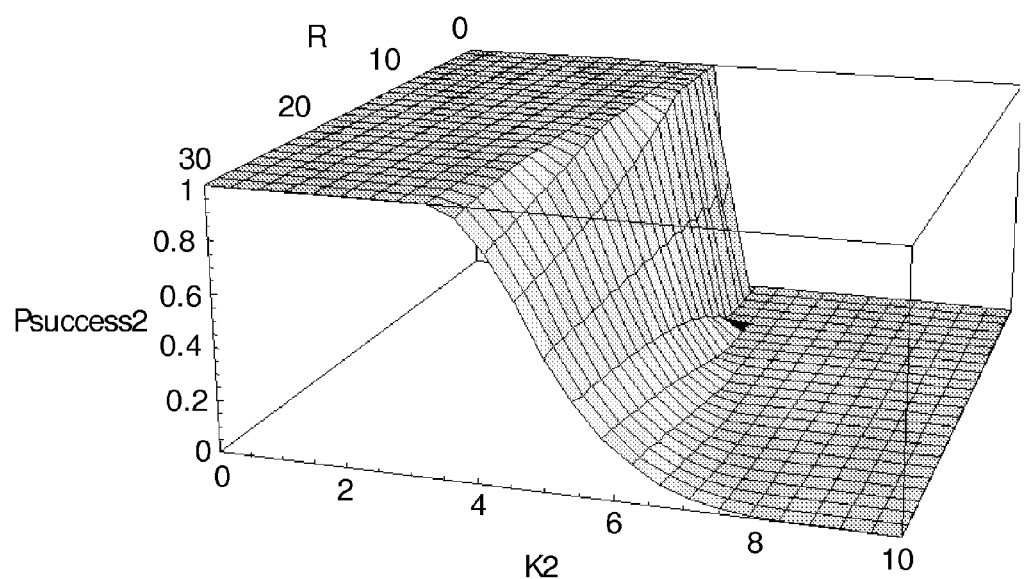
FIG. 6 shows a probability of channel access for one node during concurrent transmissions.
Figure 7:
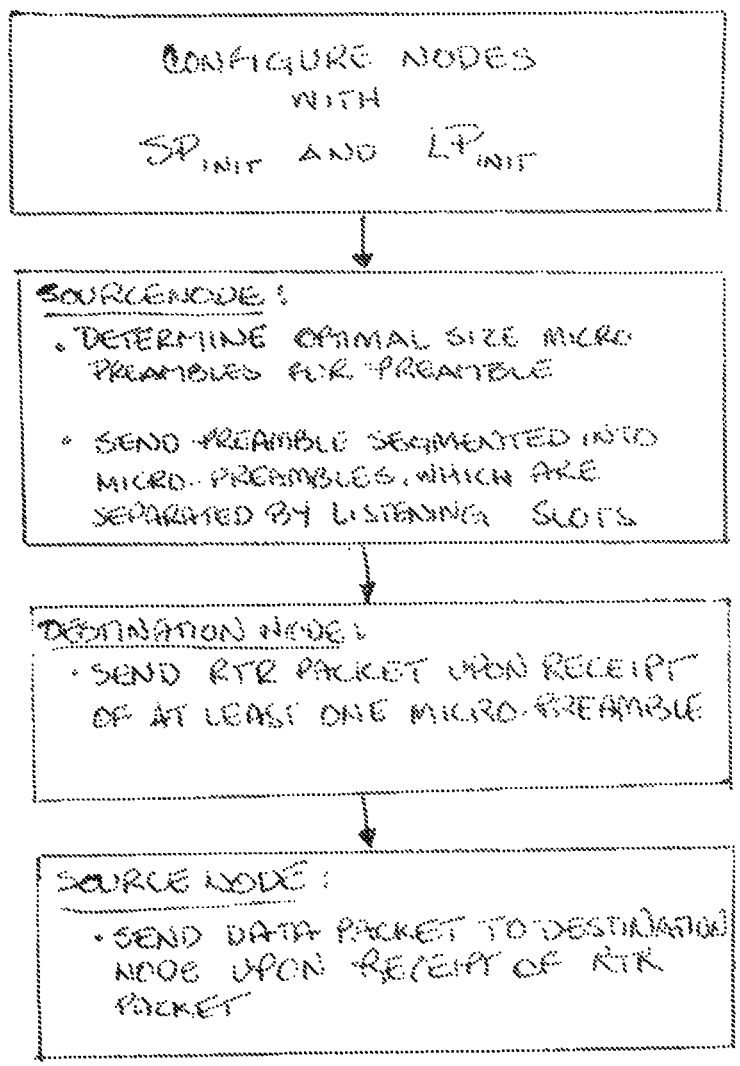
FIG. 7 shows an exemplary method for data packet transmission between a source node and a destination node in a network, wherein the exemplary method is realized in accordance with the principles of the invention.

FIG. 6 shows the probability that node 2 successfully takes advantage on node 1.

We clearly see that when $k_2$ is much smaller than 5, then node 2 always has the priority (i.e. accesses the channel). On the contrary when $k_2$ is much bigger than 5, then node 1 has priority. Around $k_2=5$, the value of R highly influences the probability of accessing the channel.

We propose following priority scheme, with $k_{opt}$ the optimal value energy wise for k calculated in the contention free MAC.

| k | priority |
|---|---|
| $k_{opt} - 2$ | very high |
| $k_{opt} - 1$ | high |
| $k_{opt}$ | normal |
| $k_{opt} + 1$ | low |
| $k_{opt} + 2$ | very low |

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of body-area networks and which may be used instead of or in addition to features already described herein.

The invention claimed is:

1. A method for data packet transmissions between a source node and a destination node in a network, the method comprising:
configuring the nodes with an initial sleeping time period duration $SP_{init}$ and an initial wake-up time period duration $LP_{init}$,
sending, by the source node, a preamble, segmented in micro-preambles, for indicating the beginning of a transmission, the micro-preambles being separated by listening slots,
sending, by the destination node, upon receipt of at least one of the micro-preamble, a packet indicating its presence, called "Ready-To-Receive", or RTR, packet, and
sending, by the source node, in response to the RTR packet, a data packet intended for the destination node,
wherein the sending of the preamble comprises:
determining, by the source node, based on said $SP_{init}$ and on said $LP_{init}$, an optimal size of the preamble as segmented into the micro-preambles that minimizes the overall energy consumption in the network for sending and receiving packets related to this preamble transmission, and
wherein the method further comprises:
determining for the source node, before transmitting the micro-preambles, a random size offset and modifying the size of the micro-preambles by applying the offset to the optimal value.

2. The method as recited in claim 1, wherein
the first micro-preamble is the first element sent by the source node to the destination node, and,
the element sent immediately after the last micro-preamble is the data packet.

3. The method as recited in claim 1, further comprising introducing a priority field in the micro-preambles transmitted by the source node, the field comprising a priority value.

4. The method as recited in claim 3, wherein the network comprises a first source node, a second source node, and a destination node, comprising:

the first source node transmitting a first micro-preamble to the destination node on a transmission channel, the first source node listening to the transmission channel, during a listening slot, and detecting a second micro-preamble transmitted by a second source node to the destination node, the first node comparing the priority value embedded in the second micro-preamble with the priority value embedded in the first micro-preamble, the first node deciding, based on the result of the comparison, to stop or to keep on transmitting further micro-preambles.

5. A method for data packet transmissions between a source node and a destination node in a network, the method comprising:

configuring the nodes with an initial sleeping time period duration $SP_{init}$ and an initial wake-up time period duration $LP_{init}$, sending, by the source node, a preamble, segmented in micro-preambles, for indicating the beginning of a transmission, the micro-preambles being separated by listening slots, sending, by the destination node, upon receipt of at least one of the micro-preamble, a packet indicating its presence, called "Ready-To-Receive", or RTR, packet, and sending, by the source node, in response to the RTR packet, a data packet intended for the destination node, wherein the sending of the preamble comprises:

determining, by the source node, based on said $SP_{init}$ and on said $LP_{init}$, an optimal size of the preamble as segmented into the micro-preambles that minimizes the overall energy consumption in the network for sending and receiving packets related to this preamble transmission, and wherein the optimal size of the preamble as segmented into the micro-preambles is determined such that the sum of micro-preambles sizes and the listening slots is equal to the value $SP_{init} + 2 \cdot LP_{init}$.

6. The method as recited in claim 5, comprising:

when the destination node enters a wake-up time period, observing the on-going traffic on the channel used for exchanging packets with the other node, based on the observing, adapting, by the destination node, the duration SP of the sleeping time period.

7. The method as recited in claim 6, wherein the adapting of the duration SP of the sleeping time period is performed:

if the channel is observed as being busy, the sleeping time period duration is decreased, and if the channel is observed as being idle, then the sleeping time is increased.

8. The method as recited in claim 6, wherein the observing comprises performing at least two observations, and storing the observation results in a memory of the node, and wherein the adapting is performed after several observations, based on the stored results.

9. The method as recited in claim 8, wherein the number of micro-preambles and idle slots is different in the preamble transmitted by the first source and the preamble transmitted by the second source.

10. The method as recited in claim 5, wherein the first micro-preamble is the first element sent by the source node to the destination node, and, the element sent immediately after the last micro-preamble is the data packet.

11. The method as recited in claim 5, further comprising introducing a priority field in the micro-preambles transmitted by the source node, the field comprising a priority value.

12. The method as recited in claim 11, wherein the network comprises a first source node, a second source node, and a destination node, comprising:

the first source node transmitting a first micro-preamble to the destination node on a transmission channel, the first source node listening to the transmission channel, during a listening slot, and detecting a second micro-preamble transmitted by a second source node to the destination node, the first node comparing the priority value embedded in the second micro-preamble with the priority value embedded in the first micro-preamble, the first node deciding, based on the result of the comparison, to stop or to keep on transmitting further micro-preambles.

* * * * *